Feb. 15, 1966 R. W. KORDES ETAL 3,235,784
D.C. TRANSMISSION SYSTEM WITH TEMPERATURE STABILIZATION
Filed May 22, 1961 2 Sheets-Sheet 1

INVENTOR.
Ralph W. Kordes
Chung-Chuan Liu
BY
P. J. Young, Jr.

Feb. 15, 1966  R. W. KORDES ETAL  3,235,784
D.C. TRANSMISSION SYSTEM WITH TEMPERATURE STABILIZATION
Filed May 22, 1961

INVENTOR.
Ralph W. Kordes
BY Chung-Chuan Liu

P. J. Young, Jr.

United States Patent Office 3,235,784
Patented Feb. 15, 1966

3,235,784
D.C. TRANSMISSION SYSTEM WITH
TEMPERATURE STABILIZATION
Ralph W. Kordes, Greece, and Chung-Chuan Liu, Rochester, N.Y., assignors to Taylor Instrument Companies, Rochester, N.Y., a corporation of New York
Filed May 22, 1961, Ser. No. 111,701
18 Claims. (Cl. 321—18)

This invention relates to the transmission of quantitative information from one place to another by electrical means, in particular, to systems utilizing an LVDT (i.e., a so-called linear variable differential transformer) to provide such information in the form of an A.C. signal voltage varying in amplitude, and an amplifying and demodulating means for acting as a high impedance source of a direct current corresponding in amplitude to the RMS amplitude of said A.C. signal voltage. Such systems are known to the art and have as their particular virtue the advantage that the said D.C. current may be transmitted long distances without loss of fidelity due to transmission line resistance, receiving device resistance, and the like, so long as the source impedance remains large in comparison to the effective impedance into which it transmits.

One object of this invention is to provide novel amplifying and demodulating means capable of functioning as a current source for faithful transmission of information to a distance receiving means.

In this instance, we are particularly concerned with solid state systems using transistors and diodes of the semi-conductive material type since these offer a miscellany of advantages such as compactness, low-voltage and low-temperature operation, current-amplification, and so on, in contrast to their vacuum tube counterparts.

While use of solid state devices in many ways parallels the use of their vacuum tube counterparts, the former have idiosyncrasies peculiar to themselves.

For example, solid state devices, such as diodes and transistors, possess temperature dependent characteristics which drastically modify their operating points, and another object of this invention is to provide novel operating point stabilization thereof with respect to temperature.

In the main embodiment of our invention, for purposes of in formation transmission, the A.C. information to be transmitted is converted from A.C. to D.C., i.e., is demodulated by means of a voltage-double rectifier. As a demodulator, the voltage-doubler rectifier provides the useful features of D.C. load current, A.C. voltage feedback proportional to D.C. load current, and the capability of grounding one side of the D.C. load.

Furthermore, this embodiment of our invention includes an oscillator providing an A.C. voltage to be modulated, by an LVDT, say, and having several solid state devices such as a reference diode and a transistor, in which the overall temperature dependency of said solid devices is stabilized by a positive temperature coefficient resistance which controls the potential of the D.C. power supply for said oscillator.

We have also discovered that the oscillator can be under-over-compensated enough to compensate an entire system, solely by said positive temperature coefficient resistor.

Again, the amplifier of this embodiment of our invention may use a ceramic capacitor providing both a low impedance regulated source of bias for a transistor stage thereof, and temperature compensation for the temperature dependency of the operating point of transistors used in the amplifier.

Figure 1:
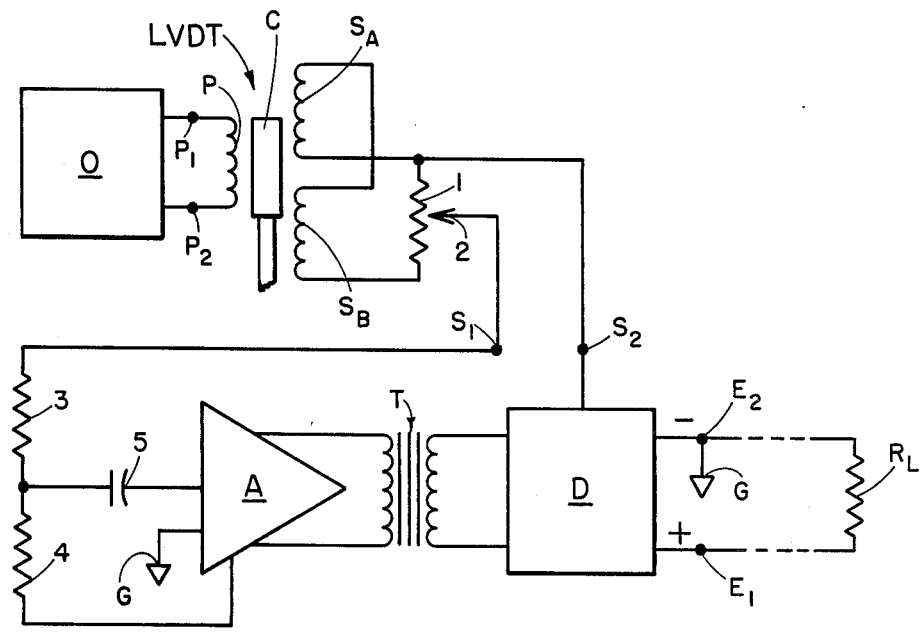
FIGURE 1 illustrates schematically a transmission system according to the invention.

FIGURE 1 illustrates schematically a D.C. transmission system according to the invention. The information to be transmitted, in this case, may be the position of the movable core C of an LVDT (i.e., a linear variable differential transformer, so-called) having a primary winding P and a secondary winding consisting of halves $S_A$ and $S_B$ connected in opposition so that the net secondary voltage induceable in the secondary from the primary winding P has a magnitude and phase depending on the position of the core and the sense of that position with respect to some null position in which said core couples winding halves $S_A$ and $S_B$ in like degree to the primary. As this expedient for converting position into voltage is old in the art, further description of the LVDT is unnecessary, at this point, except to remark that an oscillator O, producing A.C. of substantially constant frequency and amplitude across the terminals $P_1$ and $P_2$, is provided, and primary P is connected across said terminals. Hence, if core C be moved, say by a pressure-responsive bellows or other such measuring element, the net R.M.S. voltage across the secondary halves will quantitatively represent the pressure, or other variable condition to which core motion is ultimately assignable. The LVDT is therefore a means for modulating the output of oscillator O in accordance with the position of core C.

There is also provided an amplifier A for amplifying the LVDT voltage and a demodulator D for converting the A.C. output of the amplifier A to a D.C. load current through a load $R_L$. Load $R_L$ represents the resistive aspect of a meter, recorder, valve-operator, or other utilization device, and the transmission line resistance connecting the load $R_L$ to a pair of output terminals $E_1$ and $E_2$ across which the D.C. output of demodulator D appears.

The LVDT output voltage is taken from a resistor 1 having a movable tap 2 that picks off a voltage from a suitable point on said resistor and applies it through a resistor 3 to an input capacitor 5 of amplifier, capacitor 5 being provided to prevent the input circuitry from affecting the bias of the first stage (not shown) of the amplifier, conveniently, a transistor amplifier. Typically, a minor feedback loop including a resistor 4 will be provided for the purpose of improving amplifier stability characteristics at low frequencies derived from, say, the final transistor stage of the amplifier A. Conveniently, amplifier A is coupled to demodulator D by a transformer T.

According to our invention, we provide a demodulator D consisting of suitable circuitry for rectifying the A.C.

voltage output of amplifier A, but having at some point thereof A.C. flowing in proportion to the D.C. in $R_L$ and such that both the load $R_L$ and amplifier A may have a common connection such as ground or a common chassis, etc.

As will be evident from FIGURE 1, the LVDT output voltage appears across terminals $S_1$ and $S_2$, one of which is connected to resistor 3 and the other —$S_2$— to demodulator D. This connection of $S_2$ is connected to suitable means in the demodulator circuitry capable of generating an A.C. feedback voltage proportional to the aforesaid A.C., and therefore proportional to the D.C. in load $R_L$. By providing a suitable number of phase-reversing stages, as is known in the art, between the LVDT secondary voltage and the place in the demodulator circuitry where the said A.C. feedback voltage arises, these said voltages will be opposed in phase when connected as indicated in FIGURE 1. Therefore, load $R_L$, looking into the system through the transmission lines (which may be very long, as indicated by dashed line in the connections between the demodulator D and load $R_L$) sees a current source of large enough effective resistance that the resistance of $R_L$ and/or the transmission lines may vary widely without affecting the current transferred to $R_L$ from the demodulator D. It will therefore be seen that the system of FIGURE 1 has the dual advantages of negative feedback around substantially the entire system and of D.C. output to the load unaffected by variation of transmission line resistance and/or of load resistance. Likewise, as indicated by reference character G, all the potentials in the system can be referred to the same ground or circuit-common potential.

Figure 2:
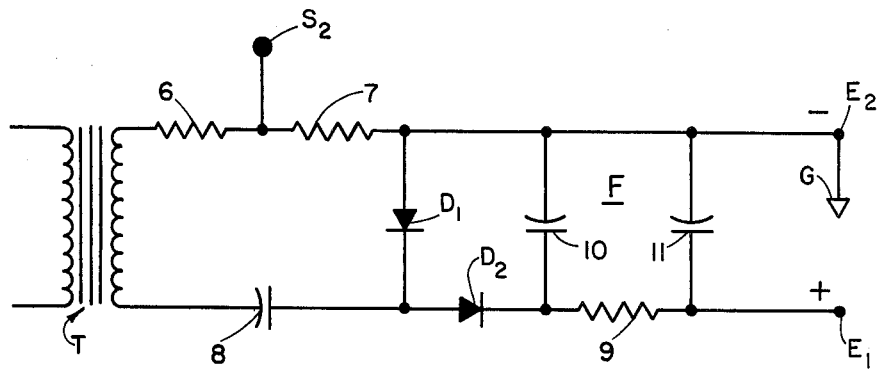
FIGURE 2 shows demodulator circuitry suitable for use in the system of FIGURE 1.

FIGURE 2 illustrates novel demodulator circuitry particularly suitable for the purposes of FIGURE 1. Essentially, said circuitry consists of diodes $D_1$ and $D_2$ and capacitor 8 in a typical voltage doubler connection to the secondary of transformer T, i.e., the output transformer of amplifier A. As is well known, in the arrangement shown, diode $D_1$ will build up approximately the peak voltage output of transformer T on the positive terminal of capacitor 8. Hence, depending on the loading at terminals $E_1$ and $E_2$, approximately twice the said peak voltage will appear across said terminals. Conveniently, a filter F including resistor 9 and capacitors 10 and 11, connected as shown in FIGURE 2, may be provided to smooth the D.C. flowing through a load connected across terminals $E_1$ and $E_2$. Filter capacitance also has the property of maintaining voltage across the load during the half-period in which half-wave rectification cuts off the A.C. voltage input to the demodulator.

In addition, however, resistors 6 and 7 are provided, connected in series between the negative side of the demodulator circuit and the end of the transformer secondary opposite to that to which capacitor 8 is connected, and terminal $S_2$ is connected to the junction between resistors 6 and 7. From the nature of the demodulator circuit, it will be seen that A.C., in proportion to D.C. in the load (i.e., $R_L$ and the transmission line, as is clear from FIGURE 1) flows through resistors 6 and 7, hence, the A.C. voltage at $S_2$ will be proportional to D.C. through the load across terminals $E_1$ and $E_2$. Furthermore, terminal $E_2$ can be common to amplifier A and $R_L$.

Figure 3:
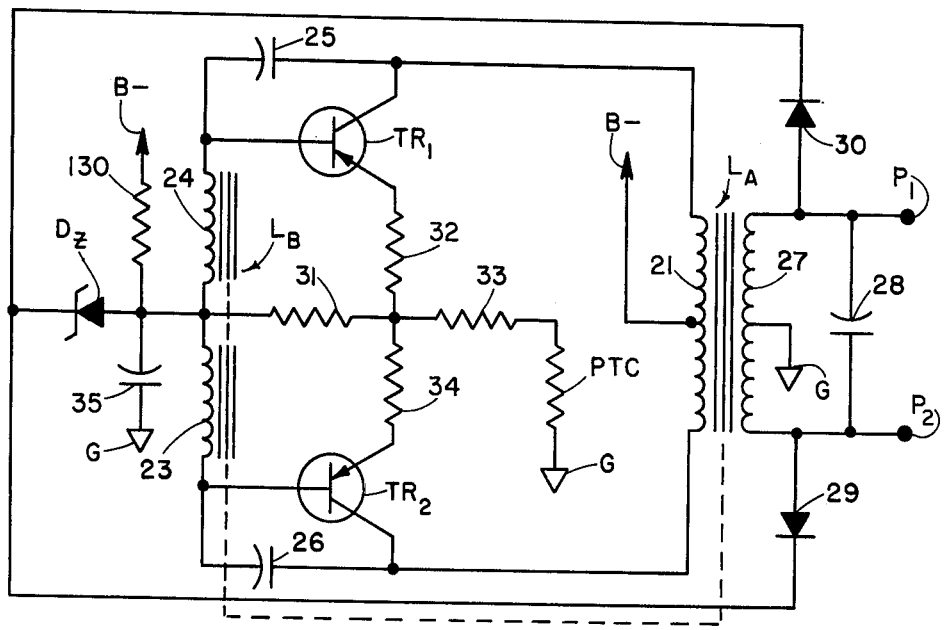
FIGURE 3 shows oscillator circuitry suitable for use in the system of FIGURE 1.

FIGURE 3 illustrates a novel oscillator circuit, which may be used as oscillator O of FIGURE 1 in order to provide suitable A.C. excitation across its output terminals $P_1$ and $P_2$ for primary P of the LVDT.

In FIGURE 3, a pair of transistors $TR_1$ and $TR_2$ are connected in tuned-collector configuration as a push-pull oscillator. The transistor bases are interconnected by primary winding 21, center-tapped to a negative supply B—, on transformer section $L_A$. Another transformer section $L_B$, providing feedback windings 23 and 24 are connected to the transistor bases as shown. In reality, sections $L_A$ and $L_B$ are parts of the same transformer unit consisting of a common core (portrayed in FIGURE 3 by a dashed line connecting the core symbols adjacent the several windings) on which all the windings are wound. Windings 23 and 24 are so arranged that if voltages appear at the collectors of the transistors, the said voltages will be regeneratively transformed into the transistor bases, i.e., with such sense as to cause the transistors to maintain collector voltages like the first said voltages, as is understood in the oscillator art. The oscillator output is taken from output winding 27, which is centertapped to ground or circuit common at G, across terminals $P_1$ and $P_2$.

Each transistor has its base and collector connected by one of capacitors 25 and 26, as shown. Also, a capacitor 28 is provided across winding 27 to tune the LVDT-loaded oscillator to the desired frequency of oscillation.

The base and emitter electrodes of the transistors are biased from B— via a series resistor 130 having its more positive end connected both to a bypass capacitor 35 and a biasing network consisting of resistors PTC and 31 to 34, inclusive, said network being connected to ground or circuit common (the positive side of the B— supply, at least) via positive temperature coefficient resistor PTC.

In addition, in order to provide a reference voltage against which to stabilize oscillation amplitude, a zener diode $D_Z$ is connected, via diodes 29 and 30, between the output of the oscillator and the junction of resistor 130 and capacitor 35. It will be seen from the circuit, as shown, that the zener diode $D_Z$, in response to change in oscillation amplitude, will control the potential at the junction of capacitor 35 and resistor 130, and thereby shift the operating point of the transistors in such a way as to oppose the said change in oscillation amplitude.

However, the solid state devices illustrated in FIGURE 2 have operating characteristics that are temperature dependent in various ways. Hence, if the said solid state devices are subject to varying temperature, the oscillatory behavior of the circuit will also vary. For example, a change in temperature of diode $D_Z$ will change the reference voltage it supplies, whereby the amplitude of oscillation will change. Again, the transistors have temperature-dependent characteristics that allow temperature changes in the transistors to affect the oscillatory behavior of the circuit.

We have found, however, that the entire oscillator may be compensated for and stabilized as a whole by a single compensating element, such as resistor PTC, suitably a copper resistor, or similar resistor of the Balco and Hytempco types.

Resistor PTC is connected to the emitter network—resistors 34, 32 and 33 so as to shunt B— to ground in accordance with the net resistance of resistor 33 and itself, obviously a temperature-dependent quantity. Resistors 34, 32 and 33 are calculated, of course, to provide the desired bias to the emitters of $TR_1$ and $TR_2$ at some particular value of the said net resistance. Resistor 33 is calculated as to adjust the range of percentage of total emitter current that can be shunted by a given resistor PTC over a given range of temperature.

Preferably, the constants of the oscillator circuit of FIGURE 3 are adjusted for class C operation, at a relatively high frequency, say about 1000 cycles.

As a result of the foregoing considerations, the oscillator of FIGURE 3 is quite sparing in the use of parts, may be powered by an unregulated supply, is highly efficient, and has an output of good wave form and stability of frequency and amplitude. Nevertheless, it is easily adjusted to produce an output of desired character, both in original manufacture or after replacement of parts without it being necessary to match parts or observe close tolerances.

Returning to the matter of temperature compensation, diode $D_Z$ is the major source of temperature-dependency of oscillation amplitude. Transistors $TR_1$ and TR₂ can be fairly well stabilized by proper choice of resistors 31, 32 and 34. However, as might be expected, the entire system of FIGURE 1 has an overall temperature-dependency corresponding to the net contribution of all the temperature sensitive elements therein. We have discovered the resistor PTC can be chosen so as to compensate for this overall temperature-dependency. System temperature-dependency reveals itself as temperature-dependent system gain, that is the current through load $R_L$, for a given position of core C, will vary with system temperature. Absent appreciable non-linearity in the net temperature response of the various elements, resistor PTC and resistor 33 can be so chsoen as to compensate for temperature variations in loop gain.

In the case of the LVDT, the copper of the windings thereof causes its output voltage to be temperature-sensitive. While it is customary to provide the LVDT with its own temperature compensation, we have found that the resistors PTC and 33 can be chosen to compensate for it.

As for the amplifier A, it may be expected that transistors and/or other elements thereof will exhibit temperature-dependency. Insofar as the transistors are concerned, although stabilization of transistor operating points, as in the case of TR₁ and TR₂ of oscillator O, will partially temperature compensate the amplifier, it is desirable to complete the compensation thereof by means of the resistor PTC.

As for demodulator D, since amplifier A is operating as a current source, the individual temperature sensitiveness of the elements of the demodulator have no effect on the current through load $R_L$, insofar as temperature conditions reasonably contemplated in normal use of the system are concerned.

In any event, resistors PTC and 33 may be so chosen as to (1) keep the amplitude of oscillation of oscillator O constant with respect to temperature, or (2) to cause oscillation amplitude to vary with temperature in such a way as to compensate not only for temperature-induced oscillation amplitude change, but also for effects such as temperature-induced variations in amplifier gain. Case (2) presupposes, that all temperature-dependent components are subject to the same thermal influence, in general, a matter of arranging said components in close physical proximity. Under case (2), therefore, temperature change in the compensated parts of the system, say oscillator and amplifier, will cause a net change in oscillation amplitude, but in such sense and amount as to compensate for the net effect of oscillator and amplifier temperature system gain.

Figure 4:
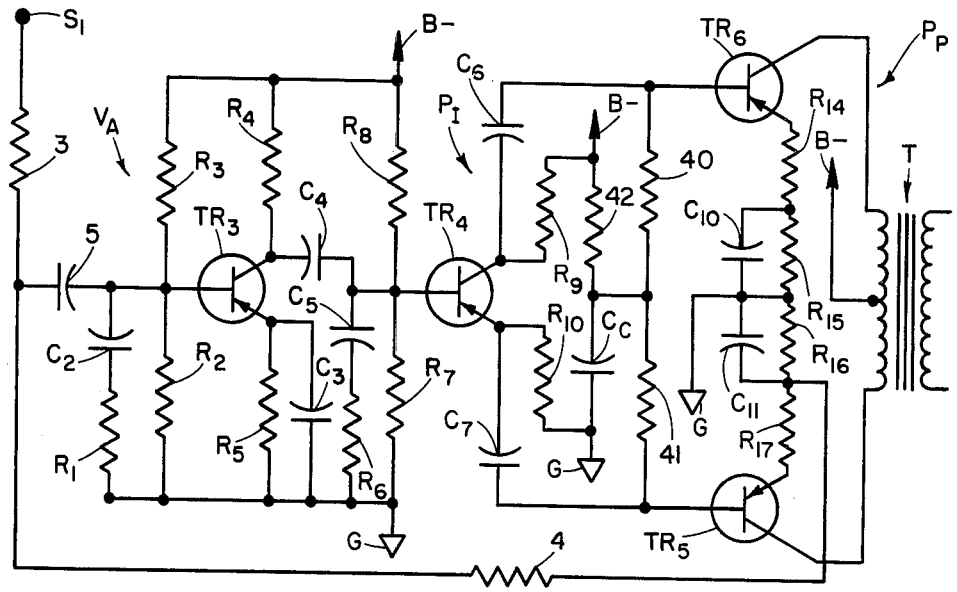
FIGURE 4 shows amplifier circuitry suitable for use in the system of FIGURE 1.

FIGURE 4 shows an amplifier circuit suitable for use as the amplifier A of FIGURE 1.

The amplifier of FIGURE 4 is, on the whole, a straightforward three-stage voltage amplifier including an input stage $V_A$, including a transistor TR₃ providing amplification of voltages appearing at the junction of resistors 3 and 4 with capacitor 5. A second stage $P_I$ including a transistor TR₄, provides phase inversion of the amplified signal, whereby a third push-pull stage $P_P$, including transistors TR₅ and TR₆, receives a double-ended input signal from stage $P_I$ and amplifies it. Transformer T receives the amplified signal and converts it to a single-ended signal suitable for application to the demodulator D of FIGURE 2. The different stages of the amplifier are provided, as shown in FIGURE 2, with suitable power sources and ground or circuit-common connections indicated by the respective symbols B— and G. Since the overall amplifier will be recognized from its showing as a conventional type transistor amplifier, description in detail of the operation thereof is unnecessary.

However, in general, the operating characteristics of solid state amplifiers are affected by the temperature of the elements thereof. In the present, the most critical stage in this respect is push-pull stage $P_P$. The bases of the transistors of this stage are biased by a network consisting of resistors 40, 41 and 42 and a capacitor $C_C$. In normal usage, one finds a fourth resistor connected between circuit common and the junction of resistors 40, 41 and 42, rather than a capacitor $C_C$, such fourth resistor and resistor 42 acting as a resistive voltage divider determining the base bias due to the B— connection of resistor 42 of the transistors TR₅ and TR₆. In a typical case, B— would be about —27 volts and the resistance of resistor 42 about fifty times that of the aforesaid fourth resistor. A biasing arrangement of this type obviously consumes power, has poor regulation and high impedance, and does not account well for the variation of the operating point of the stage $P_P$ with temperature.

We have found, however, that if the capacitor $C_C$ is of a ceramic type, wherein the so-called avalanche discharge effect occurs at a potential (with respect to G) of about that which it is desired to apply to the junction of base resistors 40 and 41, it results that the biasing arrangement of stage $P_P$, as illustrated, has good regulation, low internal impedance and compensates for the effect of temperature on the operating point of stage $P_P$.

The avalanche discharge effect and ceramic capacitors are well known in the art. However, in brief, it is known that capacitors, particularly those having a ceramic dielectric of the titanate type can be made to break down at relatively low potentials after the fashion of semi-conductor diodes, e.g., so-called zener diodes. If a D.C. voltage is applied across such a capacitor and varied from zero, initially the capacitor behaves as a capacitor: practically no current flows. However, when the absolute value of the voltage drop across the capacitor increases to a certain value, typified by the design of the materials and dimensions of the capacitor elements, a dielectric breakdown mechanism comes into play with ever-increasing magnitude and at such a rate that a large enough current flows through the capacitor and sharply limits the voltage across the capacitor. For transistor bias purposes, a capacitor $C_C$ can be chosen such that the limiting voltage is held within a range of a few tenths of a volt over a nominal breakdown voltage of four or five volts. Since in the breakdown condition the capacitor acts as very low resistance, $P_P$ can be designed such that the proper bias therefor results when a voltage of about the avalanche value for capacitor $C_C$ is applied to the junction of resistors 40 and 41 proportioning resistor 42 so that a voltage always sufficient to cause capacitor $C_C$ to break down exists between the negative side of $C_C$ and G (which is, in effect, the positive terminal or side of the D.C. source providing B—). Hence, use of the capacitor $C_C$ to set the operating point of stage $P_P$ provides the well-known benefits of a low internal impedance, regulated, bias source. In addition, however, the avalanche effect is dependent on temperature in the sense needed to oppose the effect of temperature on the transistor characteristics of the transistors of stage $P_P$. We have found that it is easy to select, from stock supplies, capacitors $C_C$ and transistors such that when connected in stage $P_P$ with the illustrated bias arrangement, the temperature dependency of the avalanching of capacitor $C_C$ will both quantitatively and qualitatively annul the effect of the temperature dependence of transistor characteristics on the operating point of stage $P_P$.

The effect of the capacitor $C_C$ is to prevent the transistors from becoming self-saturated. As the temperature increases, a self-bias effect occurs that shows up as an increase in quiescent collector current due to an increase in leakage. The capacitor $C_C$, however, avalanches at lower voltages as the temperature increases, thus decreasing the external bias current. The total bias, which is due in part to leakage current and to external bias, therefore tends to remain the same even though leakage increases due to increasing transistor temperature.

Using the capacitor $C_C$ in place of the usual resistor also economizes on the consumption of power for the maximum voltage applied to capacitor can be set to be several times smaller than that which would be needed to cause the said usual resistor to apply the desired voltage at the junction of resistors 40 and 41, that is, less current need flow when the capacitor $C_C$ is in a state of avalanche discharge such as to furnish the proper bias, than needs to flow through a resistor to impose the same bias on the junction of resistors 40 and 41.

It will be seen that the effect of capacitor $C_C$ is more than a like supplement to the effect of resistor PTC. Resistor PTC can account for the net effect of temperature on the system but cannot do anything about what temperature does to individual circuit elements, e.g., transistors $TR_5$ and $TR_6$ in the amplifier. Only if the temperature characteristic of the operating point of the said transistors stays within certain bounds and is fairly linear can the resistor PTC account for the effect of temperature on the system. Capacitor $C_C$, by leveling and straightening out the temperature operating point characteristic of the amplifier's output transistors, improves the linearity of and diminishes the temperature-dependency of amplifier gain.

Insofar as overall stability of amplifier A is concerned, it is to be noted that the circuitry of the input stage thereof is designed with the impedance characteristics of the input source in mind. For example, a typical LVDT, such as might be used in the system of FIGURE 1, has both inductance and resistance, and may have an A.C. impedance in the vicinity of 1000 ohms, and become a source of high-frequency instability.

Again, the bias circuitry of transistors $TR_3$ and $TR_4$ (and of $TR_5$ and $TR_6$, if capacitor $C_C$ be dispensed with) can be chosen such as to partially stabilize the said transistor operating points with respect to temperature.

Finally, the negative feedback loop including resistor 4 is designated with low-frequency stabilization in mind.

The foregoing is in accordance with known principles and considerations and need not be entered into further here. However, at the end of this specification we have appended the constructional details of the depicted circuitry, so as to illustrate a specific application of the principles involved.

In the foregoing, we have used the terms "stability" and "compensation," without directly inquiring into the implications of these terms. However, compensating and stabilizing must be looked at both from the point of view of the whole system and from the point of view of different elements in the system. For example, the LVDT, oscillator O, amplifier A and demodulator D are subject, as a system, to a net change in system gain as a result of thermal influences, and this net change can be balanced out simply by the resistor PTC, provided that the net temperature effect is linear (assuming PTC to have a linear temperature-resistance characteristic), or, speaking more generally, resistor PTC can change its resistance in a manner exactly inverse to the system change in gain with respect to temperature. A result such as this can be easily attained within certain limits and may be called "temperature compensation." However, this compensation does not insure stability, because individual parts of the system, notably the output stage $P_P$ of amplifier A, have their own peculiarities under the influence of varying temperatures, and these peculiarities may or may not be reached by the overall system "compensation." (Also, it is more difficult to assure that the whole system "feels" the same thermal effects in the same way so to speak, than it is to insure that a few components do so. For this reason, therefore, it is convenient to provide the LVDT with its own temperature compensation, which leaves the oscillator compensation only the oscillator and amplifier to cover.)

Since transistors have a temperature characteristic that is only approximately linear and that can get out of control if only overall system "temperature compensation" is provided, we find that the action of capacitor $C_C$ to be a definite improvement, insofar as system stability is concerned, for it stabilizes the operating point of the pushpull stage of amplifier A as described above. In other words, the effect of the capacitor $C_C$ is to obviate the chance that non-linear operating point changes in the amplifier's output transistors will occur and degrade system operation in spite of the action of resistor PTC. Obviously, therefore capacitor $C_C$ and resistor PTC cooperate to increase the degree of stability of system gain consequent upon their several effects in response to temperature.

The foregoing is pointed out in order to make it clear that capacitor $C_C$ and resistor PTC are not mere alternative compensating features, and that capacitor $C_C$ is not merely an auxiliary feature that can do part of what PTC does in the way of temperature. On the other hand, it is true that the overall system can get along without the compensating capacitor $C_C$, and each of capacitor $C_C$ and resistor PTC is a useful feature in its own right when utilized as disclosed herein.

In one successful embodiment, the following sets of parts values were used to provide a transmission system having a D.C. load current of 1–5 ma., corresponding to approximately 0.120 inch of travel of core C of the LVDT and to a range 8.4 volts R.M.S. across the secondary of the LVDT, loaded by a resistor 1 variable from 0 to 10,000 ohms. It is to be understood, however, that the given parts values are only exemplary of the results of applying routine design principles to the end of devising a particular form of the invention suitable for commercial production. Those skilled in the art will be aware that considerable variations in parts values, and even in circuitry, are possible without departing from the invention as we claim it herein.

Having in mind a battery or rectifier supply capable of providing a B— of —27 volts, D.C., and LVDT having the specifications indicated before when excited by 20 volts R.M.S., across its primary P, when resonated with the impedance it sees across terminals $P_1$ and $P_2$ at oscillator frequency, the oscillator specifications for 950 cycles may be as follows:

| | |
|---|---|
| Capacitor 35 | 1 mf. |
| Capacitors 25 and 26 | 0.0005 mf. |
| Resistor 130 | 7,500 ohms. |
| Resistor 31 | 220 ohms. |
| Resistors 32 and 34 | 10 ohms. |
| Resistor 33 | 15 ohms. |
| Resistor PTC | Balco alloy #36, 65 ohms at 80° F., temperature coefficient of 0.4% per degree C. |
| Capacitor 28 | 0.5 mf. |
| $TR_1$ and $TR_2$ | 2N1172. |
| Diode $D_Z$ | 1N1317. |
| Diodes 29 and 30 | PT505. |
| Oscillator transformer $L_A$, $L_B$ | Windings 23, 24 80 turns each; winding 21, 380 turns; winding 27, 480 turns. |

The value for resistor PTC depends on what items are to be compensated. The value of PTC given above compensates for amplifier and oscillator only in the range of 20° F. to 160° F. For oscillator compensation only, the value of resistor PTC would be increased, resistor 33 being decreased at the same time so that the sum of both resistors would be about 80 ohms at 80° F.

If the LVDT is to be temperature compensated as well, it is necessary to decrease the given value of resistor PTC, since the temperature-dependency of the LVDT is opposite to that of amplifier and oscillator.

In the amplifier A:

| | |
|---|---|
| Capacitors 5, $C_3$, $C_4$, $C_6$, $C_7$ | 100 mf. |
| Capacitor $C_2$ | 0.05 mf. |
| Capacitor $C_5$ | 0.1 mf. |
| Capacitors $C_{10}$, $C_{11}$ | 200 mf. |
| Capacitor $C_C$ | 2.2 mf. at 3 volts D.C. (nominal), avalanche voltage 4 volts D.C. ±0.2 volt as 5 ma., with temperature coefficient of −0.065% per degree F. |
| Resistor 3 | 1,500 ohms. |
| Resistor 4 | 3,900 ohms. |
| Resistor $R_1$ | 22 ohms. |
| Resistors $R_2$, $R_7$ | 10,000 ohms. |
| Resistor $R_3$ | 100,000 ohms. |
| Resistors $R_4$, 42 | 22,000 ohms. |
| Resistor $R_5$ | 4,700 ohms. |
| Resistor $R_6$ | 68 ohms. |
| Resistor $R_8$ | 15,000 ohms. |
| Resistor $R_9$ | 680 ohms. |
| Resistor $R_{10}$ | 1,800 ohms. |
| Resistors 40, 41 | 150 ohms. |
| Resistors $R_{14}$, $R_{17}$ | 4.7 ohms. |
| Resistors $R_{15}$, $R_{16}$ | 220 ohms. |
| $TR_3$, $TR_4$ | 2N369. |
| $TR_5$, $TR_6$ | 2N1172. |
| Transformer T | Turns ratio, center tapped primary to secondary=650:820. |

In demodulator D:

| | |
|---|---|
| Capacitor 8 | 50 mf. |
| Capacitors 10, 11 | 5 mf. |
| Resistor 6 | 680 ohms. |
| Resistor 7 | 175 ohms. |
| Resistor 9 | 150 ohms. |
| Diodes $D_1$, $D_2$ | PT515. |
| Load resistance $R_L$ | Up to 8,000 ohms. |

While we have disclosed only an LVDT as a modulator for the system, it is obvious that other types of modulators can be used in its place.

As shown, the transistors of the oscillator O and the amplifier A are of the PNP type. Obviously, NPN transistors could be used also, and it is within the skill of the art to arrange polarities of capacitors, diodes, bias sources, etc., to suit the requirements of NPN transistor types.

Furthermore, as suggested by FIGURE 1, specifically different oscillators and amplifiers could be combined with the specific demodulator D without detracting from the advantageous characteristics of demodulator D. However, as a whole, the specific circuitry of the various components of the system provides a system with high overall reliability and precision of operation together with economy and simplicity of manufacture, adjustment, maintenance and repair.

Having described our invention in the best form known to us at this time and having disclosed its manner of use and construction such as to enable one skilled in the art to practice and to make use of our invention, we claim:

1. In combination, an A.C. amplifier having an output and an input; first circuit means for coupling an A.C. voltage to said input and second circuit means for coupling a D.C. load to said output, said second circuit means including a first diode connected across said output whereby output pulses of one sense are blocked at one side of said first diode, a second diode having one side connected to said one side of said first diode, the said one side of said second diode being such as to block output pulses of the other sense, an said load being connected between the other sides of said diodes; there being capacitance connecting said one side of said first diode to one side of said source, whereby A.C. flows in a portion of said circuit means, D.C. flows through said load, and said A.C. is proportional to said D.C.; deriving means for deriving an A.C. voltage from said portion of said circuit means, said deriving means being constructed and arranged to generate said A.C. voltage in proportion to said A.C. flowing in said portion of said circuit means; and feedback means feeding back the last said A.C. voltage to said input, said amplifier being so constructed and arranged that if an A.C. voltage to be amplified is applied to said input, said A.C. flowing in said portion of said circuit means has such phase relation to said A.C. voltage to be amplified, that the A.C. voltage feedback to said input is opposed in phase to said A.C. voltage to be amplified.

2. The invention of claim 1, including capacitance connected across said load, one side of the last said capacitance being connected between said load and the other side of said second diode.

3. The invention of claim 1, wherein said deriving means includes resistance connecting the other side of said output to the other side of said first diode, and said feedback means is conductive means connected between said resistance and said input; said input and said load having a common connection, whereby both said A.C. voltages are referred to a common potential.

4. The invention of claim 1, including a transformer having an output winding across which said A.C. voltage to be amplified occurs, said transformer winding being connected in series with said input and said A.C. voltage derived by said deriving means, said circuit means and said input having a common point of reference potential.

5. The invention of claim 4, wherein said amplifier has, as an input amplifying element, a transistor having an input electrode that is D.C. biased with respect to said reference potential, and includes a D.C.-blocking capacitor connecting one end of said output winding to said input electrode.

6. The invention of claim 1, including a transformer having a primary winding, a secondary winding comprised of opposed, serially-connected halves, and a core coupling said halves to said primary winding, said core being movable to differentially vary the coupling between said windings; an oscillator for exciting said primary winding, the arrangement being that a net A.C. voltage appears across said secondary winding, said net A.C. voltage representing in phase and magnitude the position of said core relative to said halves, one end of said secondary winding being connected to said input and the other end of said secondary winding being connected to said feedback means so as to receive the said A.C. voltage feedback in series with the said net A.C. voltage, and said circuit means and said input having a common point of reference potential.

7. The invention of claim 1, wherein said output is the secondary winding of a transformer having a primary winding excited by said amplifier in accordance with said A.C. voltage to be amplified, said second circuit means being connected across the said secondary winding.

8. The invention of claim 1, including transistor means as an output amplifying element of said amplifier, said transistor means being arranged to amplify said A.C. voltage to be amplified, and to provide it, as amplified, at said output; said transistor means including an electrode, and there being a D.C. bias source connected to said electrode to bias said electrode with respect to a point of reference potential; a capacitor connected between said point of reference potential and said electrode, said capacitor having an avalanche discharge characteristic when biased to a potential corresponding to that to which said D.C. bias source biases said electrode, said avalanche discharge characteristic having a temperature dependency such that said capacitor varies the bias on said electrode such as to compensate for temperature-induced changes in the amplifying characteristic of said transistor means, said transistor means and said capacitor being arranged to be subject to the same thermal influences.

9. In an oscillator having a transistor, a source of D.C. bias and suitable circuit elements so arranged as to interconnect said transistor and said source in such manner as to cause said oscillator to produce oscillations of given amplitude and frequency, said source having a first terminal to which the base of said transistor is connected, said source being constructed and arranged so as to produce a potential at said first terminal suitable for biasing said transistor as required to maintain said oscillations, said source also including a second terminal to which said potential is referred; a zener diode connected to receive said oscillations and to produce a voltage proportional to the amplitude of said oscillations but of opposite sign with respect to said potential, said first terminal being connected to said diode such that said voltage is algebraically added to said potential to regulate the amplitude of said oscillation; there being a third terminal and the emitter of said transistor being connected to said third terminal; circuit means interconnecting said first and third terminals for providing said emitter with bias from said source; and resistive means having a positive temperature coefficient of resistance, said resistive means being connected between said second and third terminals whereby said potential is directly proportional to the temperature of said resistive means, said diode, transistor and resistive means being arranged so as to be subjected collectively to the same thermal influences, and said resistive means being so proportioned as to the effect of its temperature-dependency on the said potential of said source that it varies said potential such as to compensate for the effect of temperature on the regulating action of said diode and for the effect of temperature on the amplifying action of said transistor.

10. The invention of claim 9, wherein said circuit means is also resistive means.

11. The invention of claim 9, wherein the first said resistive means includes a fixed-value resistor and a positive temperature coefficient resistor, said resistors being connected in series between said second and third terminals, and said fixed resistor being chosen so as to cause the percentage change due to the effect of temperature on the second said resistor, of total resistance between the last said terminals to vary the potential of said first terminal in accordance with a desired function of temperature.

12. In combination, an amplifier having a transistor and a source of bias potential, said transistor including a plurality of electrodes and said source of potential having a connection to one of said electrodes for biasing said one of said electrodes with respect to a reference potential, whereby to determine the operating point of said transistor; and means for stabilizing said operating point, said means including a capacitor exhibiting avalanche discharge in response to said bias potential, one side of said capacitor being connected to said one of said electrodes, and the other side being connected to said reference potential whereby said bias potential cannot exceed a value fixed by avalanche discharge of said capacitor.

13. The invention of claim 12, wherein said capacitor has a temperature-dependent avalanche discharge characteristic, the temperature dependency of said characteristic having a sense such as to vary said bias potential in a sense such as to oppose shift of said operating point as a result of temperature dependency of the operating characteristics of said transistor, said capacitor and said transistor being arranged so as to be subject to similar temperature conditions.

14. A temperature compensated transistor amplifier, said amplifier including a transistor, a source of D.C. bias, and a resistor connected between an electrode of said transistor and one side of said source; a capacitor connected between said one side of said source and the other side of said source; said capacitor being of the avalanche type, and so chosen as to be in a state of avalanche discharge when the connection of said resistor to said source is at a potential, referred to the said other side of said source, to bias said electrode to a desired value.

15. The invention of claim 14, wherein the amplifying characteristics of said transistor are a function of the bias on said electrode and of the temperature of said transistor, the avalanche voltage of said capacitor is a function of its temperature, and said capacitor and transistor are associated so as to the subject to the same thermal influences, whereby the said bias on said electrode, due to said source, is also a function of temperature; said capacitor being so chosen that its temperature variation of avalanche voltage varies in such sense and amount as to vary the said bias on said electrode in such manner as to keep the amplifying characteristics of said transistor substantially constant with respect to temperature.

16. In combination, transistor means, a bias source, a diode, and circuitry including said transistor means, said diode and said source, in an arrangement wherein said transistor means is provided with bias voltage by said source and in response produces oscillations of a given freqcency and amplitude, said transistor means having base, emitter and collector electrodes connecting it in said circuitry; said diode being connected between one side of the first said bias source and said oscillations, and being responsive to said oscillations to produce a reference voltage; circuit means applying bias voltage modified by said reference voltage to said electrodes in such fashion as to regulate said amplitude; means for modulating said oscillations; amplifying means including further transistor means and a further bias source, said further transistor means and said further bias source being arranged for amplifying the resultant modulated oscillations, said further bias means being connected to said further transistor means such as to establish an operating point for said further transistor means, which operating point corresponds to the desired amplification by said further transistor means of said modulated oscillations; and compensating resistance means connected between said circuit means and the other side of the first said bias source, said compensating resistance means having a temperature coefficient of resistance, said coefficient having a sense and a value such as to vary the bias in said source in such fashion as to counteract the effect of the temperature on said transistor means and on said diode; one of said electrodes being an emitter of said transistor means.

17. The invention of claim 16, wherein said amplifier means includes a capacitor effectively connected across said further bias source, said capacitor being of the avalanche discharge type, and having an avalanche voltage corresponding to the operating point desired to be established for said further transistor means.

18. The invention of claim 17, wherein said capacitor's avalanche discharge characteristic has a temperature coefficient, and its said coefficient is such as to cause said avalanche discharge to occur at voltages varying in such a way as to counteract temperature change of said operating point.

References Cited by the Examiner

UNITED STATES PATENTS

| | | | |
|---|---|---|---|
| 2,823,312 | 2/1958 | Keonjian | 330—23 |
| 2,885,498 | 5/1959 | Bruck et al. | 330—23 |
| 2,914,685 | 11/1959 | McVey | 330—23 |
| 2,968,738 | 1/1961 | Pintell | 321—2 |
| 3,005,955 | 10/1961 | Grant | 321—2 |

LLOYD McCOLLUM, *Primary Examiner.*

ROBERT L. SIMS, *Examiner.*

G. J. BUDOCK, G. GOLDBERG, *Assistant Examiners.*